US006961048B2

(12) United States Patent
Mitchell

(10) Patent No.: US 6,961,048 B2
(45) Date of Patent: Nov. 1, 2005

(54) DISPLAYING INFORMATION ON KEYS OF A KEYBOARD

(75) Inventor: Levon A. Mitchell, Union City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 174 days.

(21) Appl. No.: 10/052,114

(22) Filed: Jan. 17, 2002

(65) Prior Publication Data

US 2003/0132915 A1 Jul. 17, 2003

(51) Int. Cl.[7] .............................................. G09G 5/00
(52) U.S. Cl. ...................................... 345/168; 345/172
(58) Field of Search ................................ 345/168, 170, 345/156, 171, 172; 341/20–22; 400/472, 400/474, 476, 483; 434/112–115

(56) References Cited

U.S. PATENT DOCUMENTS 3,934,246 A * 1/1976 Mueller ...................... 345/170
4,527,862 A 7/1985 Arakawa
4,752,772 A * 6/1988 Litt et al. ................... 345/168
4,897,651 A 1/1990 DeMonte
4,962,530 A * 10/1990 Cairns ........................ 345/170
5,016,002 A * 5/1991 Levanto ....................... 345/50
5,818,361 A 10/1998 Acevedo
5,832,113 A 11/1998 Sano
5,896,076 A * 4/1999 van Namen ................ 335/229
6,278,441 B1 * 8/2001 Gouzman et al. ........... 345/163
6,281,812 B1 8/2001 Kim
6,542,623 B1 * 4/2003 Kahn ......................... 382/114
2003/0117371 A1 * 6/2003 Roberts et al. ............. 345/156

* cited by examiner

*Primary Examiner*—Amare Mengistu
(74) *Attorney, Agent, or Firm*—Meyertons Hood Kivlin Kowert & Goetzel, P.C.; B. Noël Kivlin

(57) ABSTRACT

The present invention provides an apparatus and method for displaying information on the keys of a keyboard. The method includes receiving a request to change the configuration of the keyboard from a first configuration to a second configuration. The method further includes determining information to display on the keys of the keyboard in the second configuration, and displaying the information on the keys of the keyboard.

5 Claims, 15 Drawing Sheets

DISPLAYING INFORMATION ON KEYS OF A KEYBOARD

BACKGROUND OF THE INVENTION

1. Field of the Invention

The invention generally relates to keyboards, and, more particularly, to displaying information on the keys of a keyboard of a processor-based system.

2. Description of the Related Art

Processor-based systems, which may include desktop computers, laptop computers, electronic devices with processors, and the like, have become popular over the years for a variety of reasons, such as improved performance and lower cost. As today's processor-based systems evolve into more robust and versatile systems, designers of peripheral devices, such as pointing devices and keyboards, have attempted to keep pace with the improvements in the processor-based systems.

However, selected peripheral devices, such as keyboards, in particular, may have some inherent restrictive characteristics that have historically limited the versatility of such devices. For example, keyboards are not readily interchangeable, particularly the keyboards that support different languages. As an additional example, the keys of a keyboard are somewhat restricted in the amount and the types of information that may be displayed on such keys.

SUMMARY OF THE INVENTION

In one embodiment of the present invention, a method is provided for displaying information on the keys of a keyboard. The method includes receiving a request to change the configuration of the keyboard from a first configuration to a second configuration. The method further includes determining information to display on the keys of the keyboard in the second configuration and displaying the information on the keys of the keyboard.

In another embodiment of the present invention, an apparatus is provided for displaying information on keys of a keyboard. The apparatus includes a key and a control unit. The key includes a matrix of display elements for displaying information on the key. The control unit is adapted to determine information to display on the key. The control unit is further adapted to activate the matrix of display elements of the key to display the determined information, detect the selection of the key, and provide the information displayed on the key to the processor-based system in response to detecting the selection of the key.

BRIEF DESCRIPTION OF THE DRAWINGS

The invention may be understood by reference to the following description taken in conjunction with the accompanying drawings, in which like reference numerals identify like elements, and in which.

Figure 1:
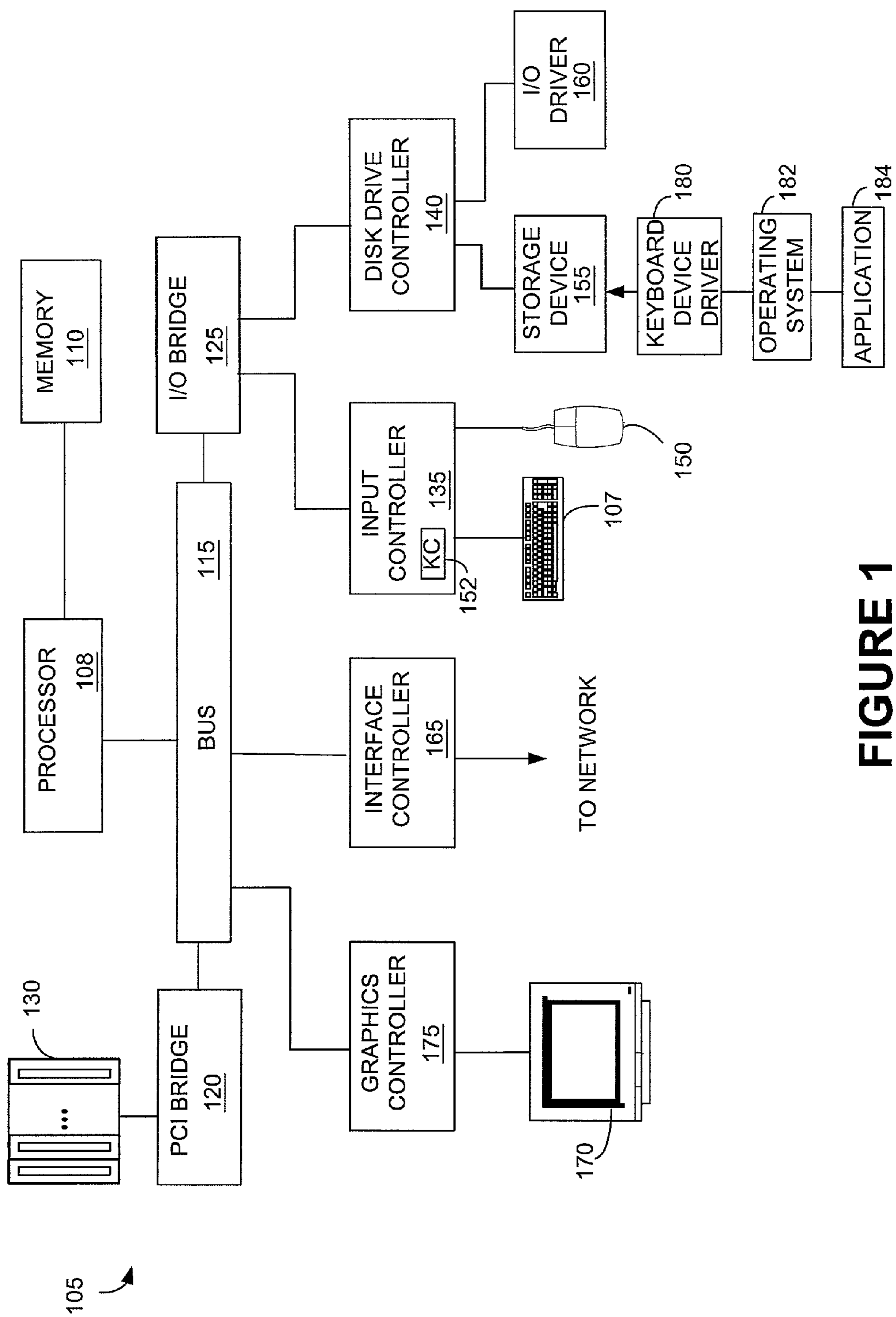
FIG. 1 is a stylized block diagram of a processor-based system in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As explained in more detail, in accordance with one or more embodiments of the present invention, a keyboard is provided for use with processor-based systems, where various types of information, including text or graphic information, may be displayed on the keys of the keyboard. In one embodiment, a reconfigurable keyboard that supports Braille letters is also described.

FIG. 1 shows a block diagram of one embodiment of a processor-based system 105. The processor-based system 105 in the illustrated example is a workstation, although in an alternative embodiment, the processor-based system 105 may be an Internet appliance, a personal computer, a laptop, a personal digital assistant or any other electronic device with a processor that is capable of receiving input from a keyboard 107. In alternative embodiments, the processor-based system 105 may be an electronic printed circuit board (PCB) with a processor, where the PCB is employed, for example, in military computer systems, telecommunications, investment companies, or any other setting where an input from the keyboard 107 is desirable. As described in more detail below, in accordance with one embodiment of the present invention, the keys of the keyboard 107 may be configured to display a variety of information, including Braille letters, graphics, text, and/or video.

The processor-based system 105 in the illustrated embodiment comprises at least one processor 108 adapted to perform one or more tasks. Although not so limited, in one embodiment, the processor 108 may be a 500-MHz UltraSPARC-IIe processor. The processor 108 may be coupled to at least one memory element 110 adapted to at least temporarily store information. For example, the memory element 110 may comprise 2-gigabytes of error-correcting synchronous dynamic random access memory (SDRAM) coupled to the processor 108 via one or more unbuffered SDRAM dual in-line memory module (DIMM) error-correcting slots.

The processor 108, in the illustrated embodiment, is coupled to a bus 115 that may transmit and receive signals between the processor 108 and any of a variety of devices that are also coupled to the bus 115. For example, in one embodiment, the bus 115 may be a 32-bit-wide, 33-MHz peripheral component interconnect (PCI) bus. A variety of devices may be coupled to the bus 115 via one or more bridges, which may include a PCI bridge 120 and an I/O bridge 125. In one embodiment, the PCI bridge 120 may be coupled to one or more PCI slots 130 that may be adapted to receive one or more PCI cards, such as Ethernet cards, token ring cards, video and audio input, SCSI adapters, and the like.

The I/O bridge 125 may, in one embodiment, be coupled to one or more controllers, such as an input controller 135 and a disk drive controller 140. The input controller 135 may control the operation of such devices as the keyboard 107, a mouse 150, and the like. Thus, in one embodiment, the input controller 135 may include a keyboard controller 152 that monitors the process received from the keyboard 107. The disk drive controller 140 may similarly control the operation of a storage device 155 and an I/O driver 160 such as a tape drive, a diskette, a compact disk drive, and the like. In one embodiment, the input controller 135 may include a universal serial bus (USB) interface. The keyboard 107, in one embodiment, may communicate with the processor-based system 105 via the USB interface, for example.

An interface controller 165 may be coupled to the bus 115. In one embodiment, the interface controller 165 may be adapted to receive and/or transmit packets, datagrams, or other units of data over the private or public networks, in accordance with network communication protocols such as the Internet Protocol (IP), other versions of IP like IPv6, or other packet-based standards as described above. Although not so limited, in alternative embodiments, the interface controller 165 may also be coupled to one or more IEEE 1394 buses, FireWire ports, universal serial bus ports, programmable read-only-memory ports, and/or 10/100 Base-T Ethernet ports.

One or more output devices such as a monitor 170 may be coupled to the bus 115 via a graphics controller 175. The monitor 170 may be used to display information provided by the processor 108. For example, the monitor 170 may display documents, 2-D images, or 3D renderings.

The storage device 155, in one embodiment, may have a keyboard device driver 180, an operating system 182, and an application 184 stored therein. The keyboard device driver 180, in one embodiment, controls the communication between the processor-based system 105 and the keyboard 107. The application 184, in the illustrated embodiment, is a software application that interfaces with the keyboard 107 through the operating system 182 and the keyboard device driver 180. In one embodiment, and as described in more detail below, the application 184 may be used to display information on the keys of the keyboard 107 as desired.

Figure 2:
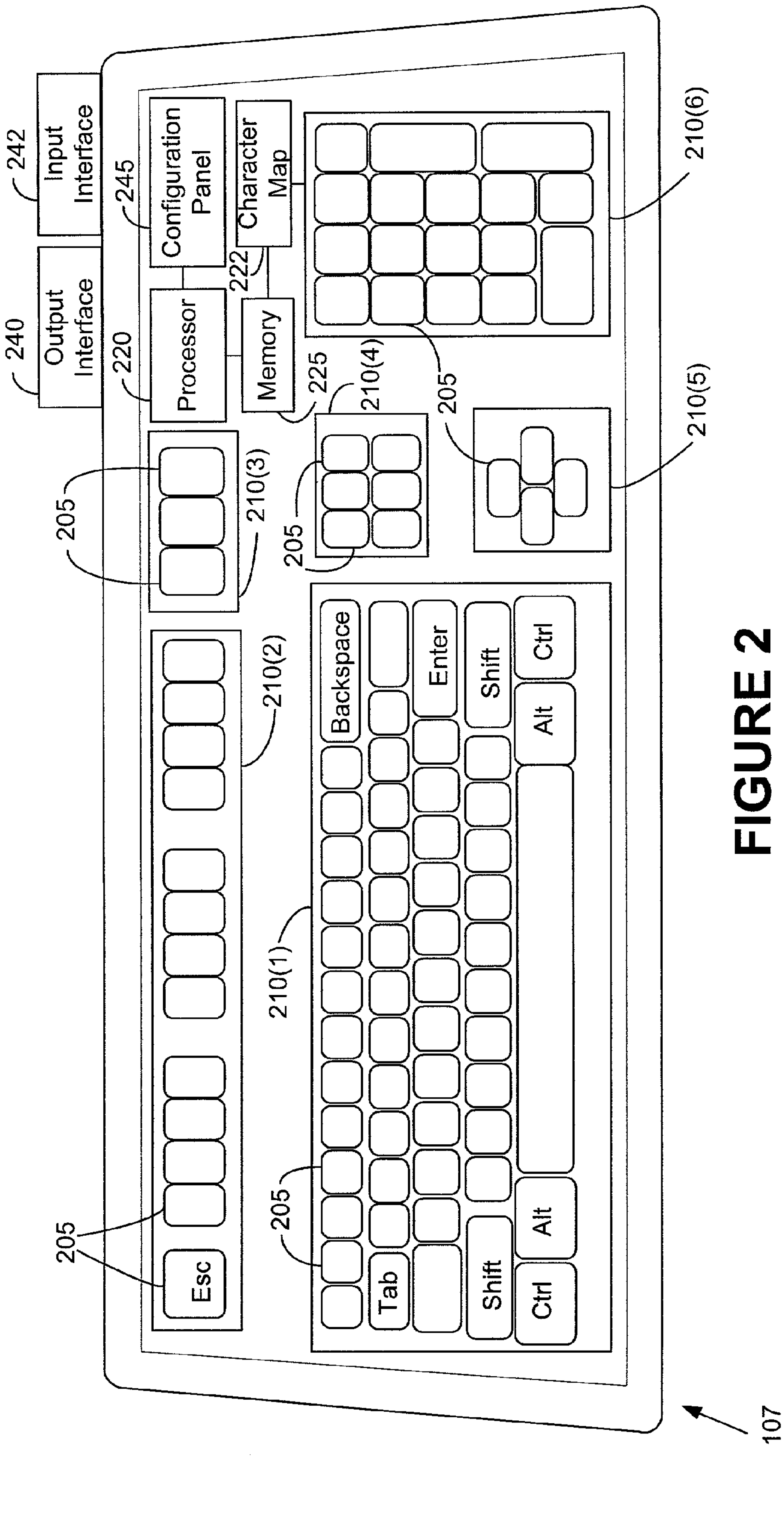
FIG. 2 is a stylized block diagram of a keyboard that may be employed with the processor-based system of FIG. 1, in accordance with one embodiment of the present invention.

For clarity and ease of illustration, only selected functional blocks of the processor-based system 105 are illustrated in FIG. 2, although those skilled in the art will appreciate that the processor-based system 105 may comprise additional or fewer functional blocks. Additionally, it should be appreciated that FIG. 1 illustrates one possible configuration of the processor-based system 105 and that other configurations comprising different interconnections may also be possible without deviating from the spirit and scope of one or more embodiments of the present invention. For example, in an alternative embodiment, the processor-based system 105 may include additional or fewer bridges 120, 125, where the one or more of the bridges 120, 125 may be coupled to audio devices, diskette drives, digital video disk drives, parallel ports, serial ports, universal serial board (USB) interfaces, smart cards, and the like. As an additional example, in an alternative embodiment, the interface controller 165 may be coupled to the processor 108 directly. Similarly, other configurations may be possible.

Referring now to FIG. 2, a stylized block diagram of the keyboard 107 is shown, in accordance with one embodiment of the present invention. For illustrative purposes, the keyboard 107 is shown having a plurality of keys 205 grouped in a plurality of sections 210(1–6). The grouping of the keys 205 into the plurality of sections 210(1–6) is loosely based on the general function performed by the keys 205 in that section 210(1–6). For example, the keys 205 in the section 210(1) comprise the base keys used by the user to enter typical information, such as alphabet characters, numeric characters, punctuation characters, and the like. The keys 205 in the second section 210(2), for example, may be function keys (e.g, F1, F2, etc.), wherein user-selected or factory-defined functions are assigned to the keys 205 in that section 210(2). The keys 205 in the third and fourth sections 210(3–4) may be control keys, for example, and may include control features such as "insert," "delete," and the like. The keys 205 in the fifth section 210(5) may be cursor keys that allow a user to maneuver a cursor on the display 170 (see FIG. 1) to a desired position. The keys 205 in the sixth section 210(6), for example, may form a "numeric keypad," which operate as numeric keys on one mode (i.e., in num-lock "on" mode) and as cursor keys in another mode (i.e., in num-lock "off" mode).

In the illustrated embodiment, the keyboard 107 includes a processor 220. Although not shown, the keyboard 107 may include a conventional key matrix (i.e., a grid of circuits underneath the keys 205). Generally, each circuit is broken at the point below each one of the keys 205. Pressing the key

205 bridges the gap in the circuit, allowing a small amount of current to flow therethrough. The processor 220, in one embodiment, monitors the key matrix for signs of continuity at any point on the grid. When the processor 220 finds a circuit that is closed, it compares the location of that circuit on the key matrix to a character map 222 in its memory 225. The character map 222 is essentially a comparison chart for the processor 220 to determine the user selected key 205 at the x,y coordinate in the key matrix. If more than one key 205 is pressed at substantially the same time, the processor 220 checks to see if that combination of keys 205 has a designation in the character map 222. For example, pressing the A key by itself results in a small letter "a" being sent to the processor-based system 105. However, selecting the combination of the "shift" key with the "a" key represents the capital letter "A" in the character map 222.

The processor 220, in the illustrated embodiment, analyzes the key matrix and determines one or more characters to transmit to the processor-based system 105. The processor 220, in one embodiment, may maintain the characters in a buffer (not shown) of the keyboard 107 before the processor 220 transmits the characters in a stream to the processor-based system 105 via an output interface 240. The output interface 240 may include, but is not limited to, a Deustche Industrie Norm (DIN) connector, IBM PS/2 mini-DIN connector, universal serial bus (USB) connector, or internal connector (for laptops or a variety of other applications).

In one embodiment, and as explained later in more detail, the keyboard 107 includes an input interface 242 for receiving information from an external source, which may include the processor-based system 105, for example. Although a single input interface 242 is shown, in one embodiment, the input interface 242 may include a plurality of input interfaces 242 that are adapted to receive a variety of signals, including control signals, configuration information signals, video signals, or any other desirable signals.

In the illustrated embodiment, the keyboard 107 includes a configuration panel 245 that allows a user to change the configuration of the keyboard 107, which is described in more detail below. In accordance with one embodiment of the present invention, as the configuration of the keyboard 107 is changed, the contents displayed by the keys 205 of the keyboard 107 are also changed to reflect the new configuration. A user may, for example, wish to change the configuration of the keyboard 107 for a variety of reasons, including: converting the keyboard 107 from a conventional keyboard to a Braille keyboard, configuring the keyboard 107 to support a different language, and/or displaying graphics or video on the keys 205 of the keyboard 107.

It should be appreciated that components shown in the block diagram of the keyboard 107 in FIG. 2 are illustrative only, and that, in alternative embodiments, additional or fewer components may be utilized without deviating from the spirit or scope of the invention. For example, in one embodiment, the keyboard 107 may include an interface to receive power. In one embodiment, the output and input interfaces 240, 242 may be integrated such that a common medium (e.g., cable, wireless transmitter) may be employed for transmitting and receiving signals to and from the keyboard 107. Additionally, it should be noted that FIG. 2 illustrates a functional block diagram of the keyboard 107 and that one or more of the selected components, such as the processor 220, output interface 240, input interface 242, although shown in FIG. 2, may not necessarily be visible to the user because such components may be strategically positioned beneath the keys 105, but above the bottom surface (not shown) of the keyboard 107. Alternatively, such components may be positioned in any other desirable location within a housing of the keyboard 107.

Figure 3A:
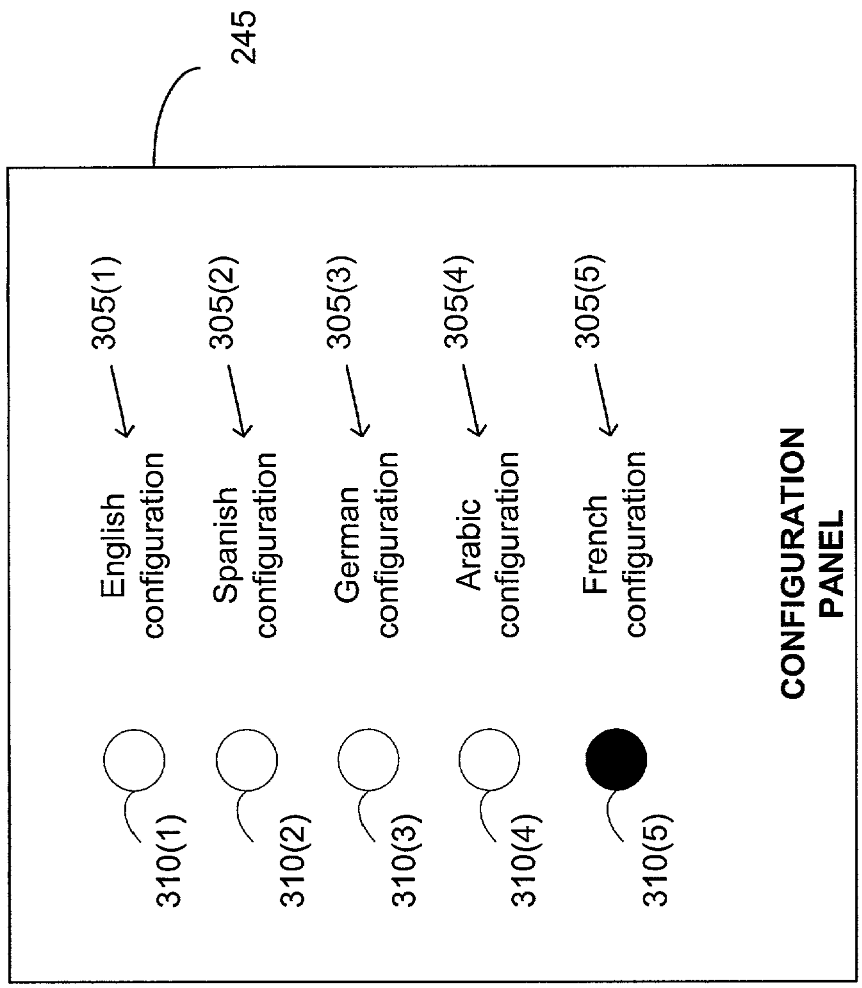
FIGS. 3A–C illustrate various embodiments of a configuration panel that may be implemented in the keyboard of FIG. 2, in accordance with one embodiment of the present invention.
Figure 3B:
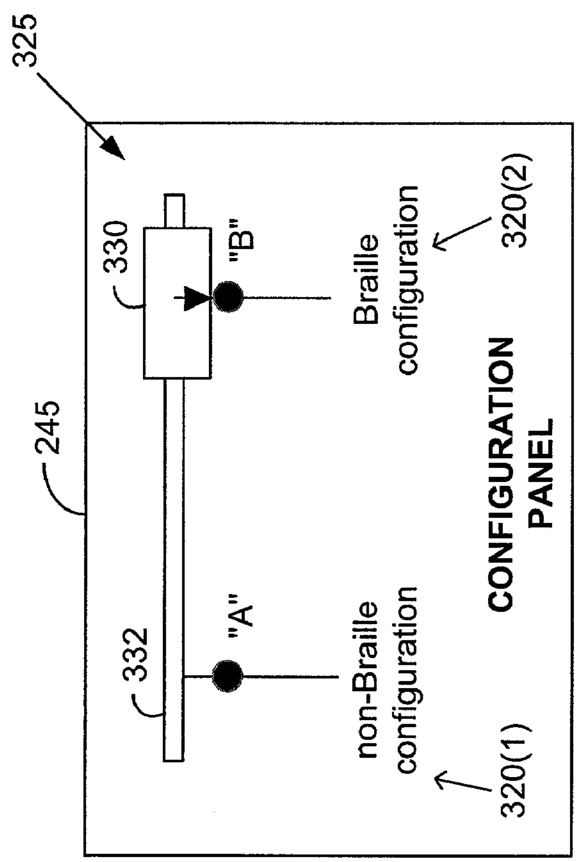
Figure 3C:
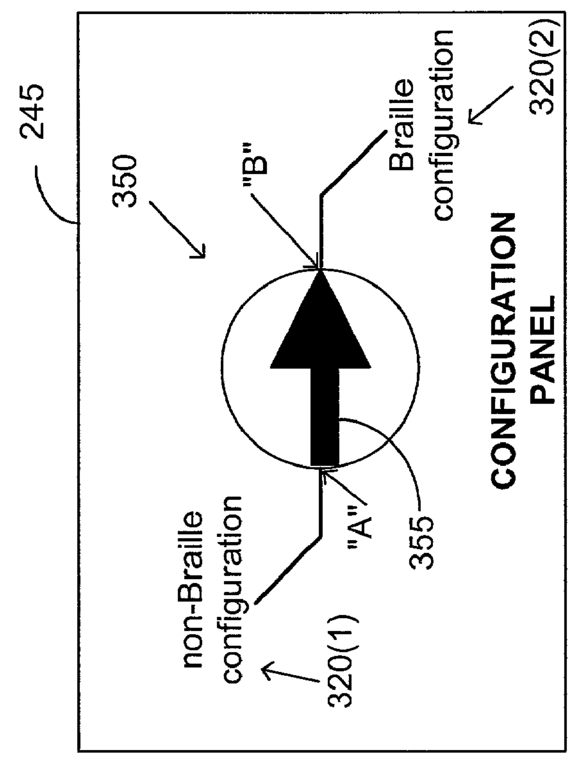

Referring now to FIGS. 3A–C, exemplary embodiments of the configuration panel 245 of the keyboard 107 are shown, in accordance with one embodiment of the present invention. In the exemplary embodiment of FIG. 3A, the configuration panel 245 includes a plurality of configurations 305(1–5) that may be selectable by a user using a configuration selection device 310(1–5). Although not so limited, in the illustrated embodiment, the configurations 305(1–5) supported by the keyboard 107 include an English configuration 305(1), Spanish configuration 305(2), German configuration 305(3), Arabic configuration 305(4), and French configuration 305(5). In the English configuration 305(1), the keys 205 of the keyboard 107 display English characters, and, in the Spanish configuration 305(2), the keys 205 of the keyboard 107 display Spanish characters, and so forth.

In the illustrated embodiment of FIG. 3A, the configuration selection devices 310(1–5) includes a plurality of push-button switches, although in alternative embodiments a variety of other selection devices 310(1–5) may be employed. A user selects a particular configuration 305(1–5) by depressing the corresponding push-button and locking that button into a "down" position. The selected button, in one embodiment, is automatically released when the user selects the push-button of another configuration 305(1–5). In the illustrated example of FIG. 3A, the keyboard 107 is configured to operate in the French configuration 305(5), as indicated by the highlighted configuration selection device 310(5).

FIG. 3B illustrates another exemplary embodiment of the configuration panel 245 of the keyboard 107. In the arrangement of FIG. 3B, the keyboard 107 is adapted to operate in two configurations, a non-Braille configuration 320(1) and Braille configuration 320(2). A user may select either one of the configurations 320(1–2) using a configuration selection device 325. In the illustrated embodiment, the configuration selection device 325 includes a selector 330 that is capable of sliding along a track 332. As such, when the selector 330 is substantially aligned with the position designated by letter "A," the keyboard 107 is adapted to support the non-Braille configuration 320(1). Similarly, when the selector 330 is substantially aligned with the position designated by letter "B," the keyboard 107 is adapted to support the Braille configuration 320(2). For example, in the illustrated example of FIG. 3B, the keyboard 107 is configured to operate as a Braille keyboard. The operation of the keyboard 107 in the Braille and non-Braille configuration 320(1–2) is described in more detail later. It should be appreciated that the selector 330 of FIG. 3B, in one embodiment, may be a rocker switch or any other desirable device or mechanism that is capable of switching the configuration state of the keyboard 107.

FIG. 3C illustrates another exemplary embodiment of the configuration panel 245 of the keyboard 107. In the arrangement of FIG. 3C, the configuration selection device 350 is a rotatable dial 350 including a selector 355 to select either the non-Braille configuration 320(1) or the Braille configuration 320(2). The keyboard 107 supports the non-Braille configuration 320(1) when the selector 355 of the dial 350 is aligned with the position marked by the letter "A," and supports the Braille configuration 320(2) when the selector 355 of the dial 350 is aligned with the position marked by the letter "B." For example, in the illustrated example of FIG. 3C, the keyboard 107 is configured as a Braille keyboard.

Figure 4B:
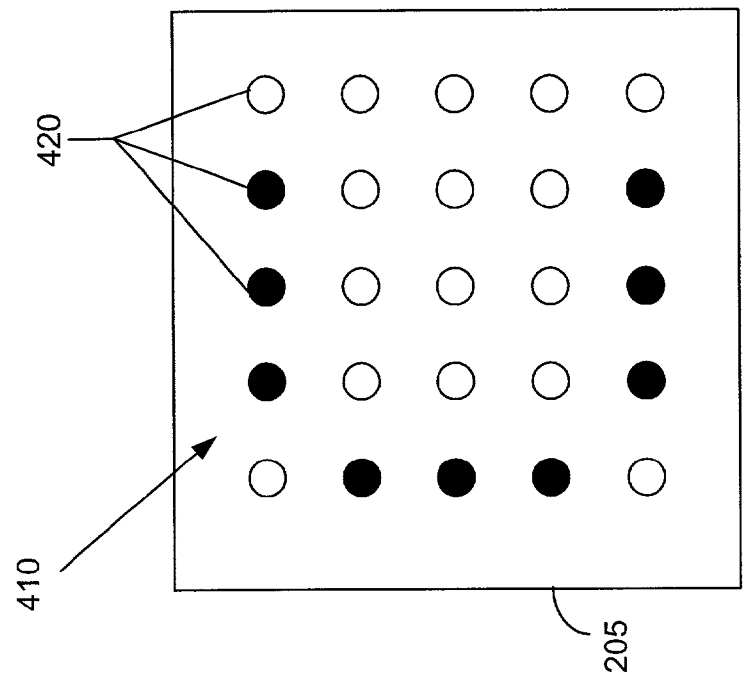
FIGS. 4A–B illustrate a stylized block diagram of a LED-based key that may be employed in the keyboard of FIG. 2, in accordance with one embodiment of the present invention.
Figure 4A:
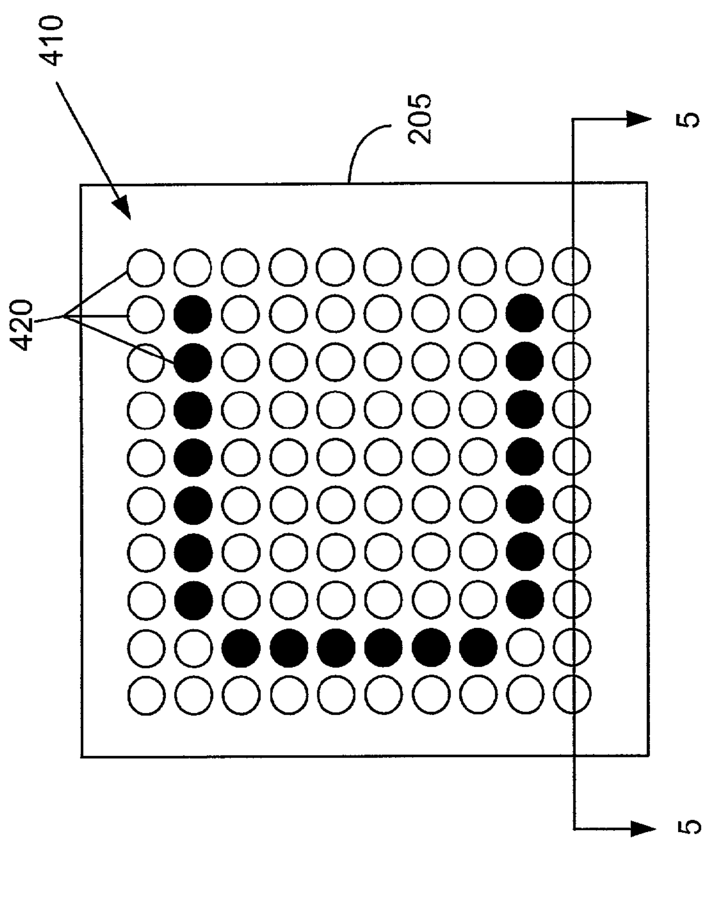

Referring now to FIGS. 4A–B, a block diagram of the key 205 of the keyboard 107 is illustrated, in accordance with one embodiment of the present invention. In particular, FIGS. 4A–B show a top view of the key 205 of the keyboard 107. In the illustrated embodiment, the key 205 is formed of a matrix 410 of light emitting diodes (LEDs) 420 or any other suitable light emitting devices. In one embodiment, a transparent layer (shown in FIG. 5), such as glass, may be positioned above the matrix 410. The processor 220 (see FIG. 2) of the keyboard 107, in one embodiment, selectively activates one or more LEDs 420 in the matrix 410 of the one or more keys 205 to display the desired information. For example, in FIG. 4A, selected LEDs 420 are activated in the matrix 410, to represent the letter "C."

The information displayed on a given key 205 may, in part, depend on the configuration selected by the user for the keyboard 107. In one embodiment, the processor 220 may utilize the character map 222 (see FIG. 2) to determine the contents (e.g., characters or graphics) that should be displayed on the keys 205 of the keyboard 107 for a particular configuration. In an alternative embodiment, the keyboard 107 may include separate character maps 222 (see FIG. 2), one for each configuration, where the character maps 222 may be utilized by the processor 220 to determine the information that should be displayed on the keys 205. In an alternative embodiment, an external source, such as the processor-based system 105, may provide to the keyboard 107 the information that should be displayed on the keys 205. For example, the user may utilize the application 184 (see FIG. 1) executing on the processor-based system 105 to transmit the information that should be displayed on the keys 205 for a given configuration.

In the illustrated example of FIG. 4A, the key 205 of the keyboard 107 is formed of a 10×10 matrix 410. In FIG. 4B, key 205 of the keyboard 107 is formed of a 5×5 LED matrix 410. The size of the matrix 410 may be implementation specific, depending on the desired resolution, for example. For a higher resolution, the number of LEDs 420 in the matrix 410 may be increased, and for lower resolution, the matrix 410 may have fewer LEDs 420. FIG. 4B illustrates the letter "C" being displayed on the key 205 using the 5×5 matrix 410.

Figure 5:
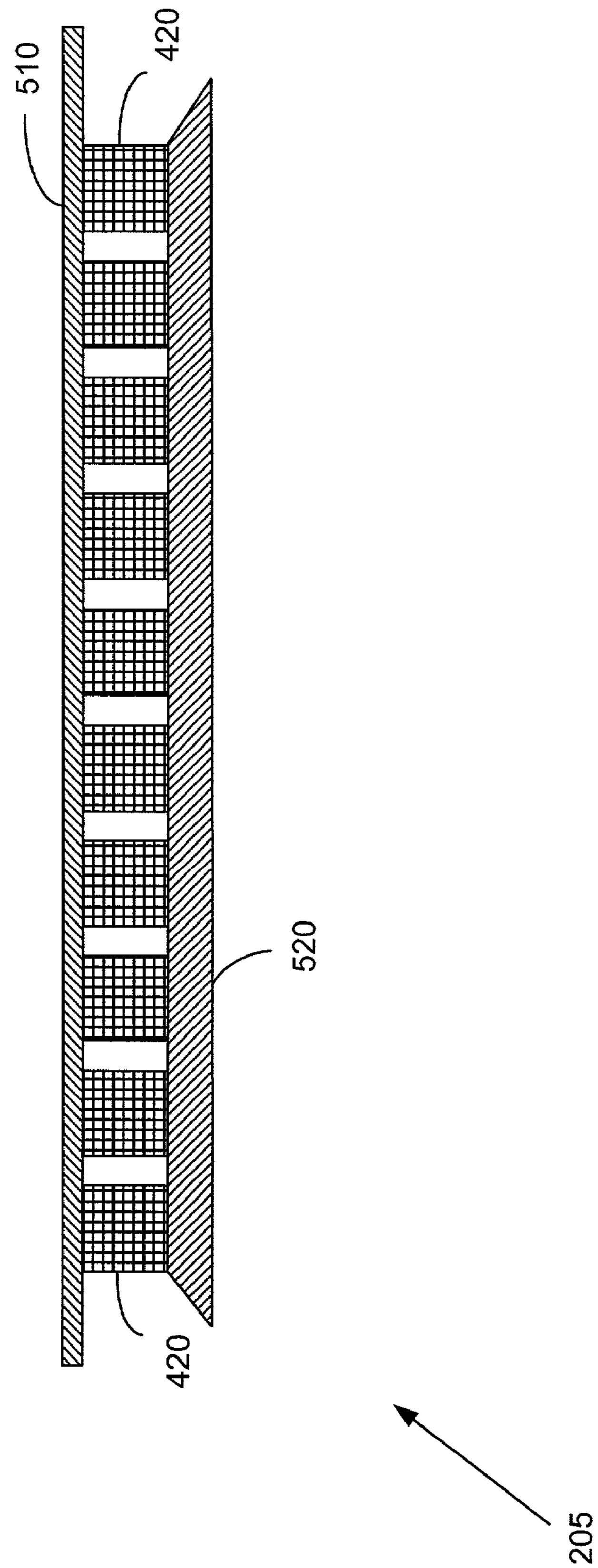
FIG. 5 illustrates a stylized cross-sectional view of the key of FIG. 4A, in accordance with one embodiment of the present invention.

Referring now to FIG. 5, a stylized cross-sectional view of the key 205 of FIG. 4A (taken along the lines 5—5) is illustrated, in accordance with one embodiment of the present invention. For clarity, a magnified cross-sectional view is provided in FIG. 5, and, as such, the illustration may not necessarily be drawn to scale. The key 205 includes a transparent layer 510, which may comprise glass or any other suitable transparent or translucent material that allows viewing of any type of display on the key 205. The transparent layer 510, in one embodiment, may be a key cap for the key 205. The LEDs 420 may be situated between the transparent layer 510 and a switching mechanism 520. The activated LEDs 420 may be seen through the transparent layer 510 by the user. In one embodiment, the switching mechanism 520 may include the desired connections to deliver power to the LEDs 420. The switching mechanism 520 may also make the desired connections with the key matrix (not shown) of the keyboard 107. The switching mechanism 520, in one embodiment, may be spring loaded, which allows the switching mechanism 520 to make contact with the key matrix when the user depresses the key 205. When not depressed, the switching mechanism 520 restores the key 205 to its original position.

Figures 6A, 6B:
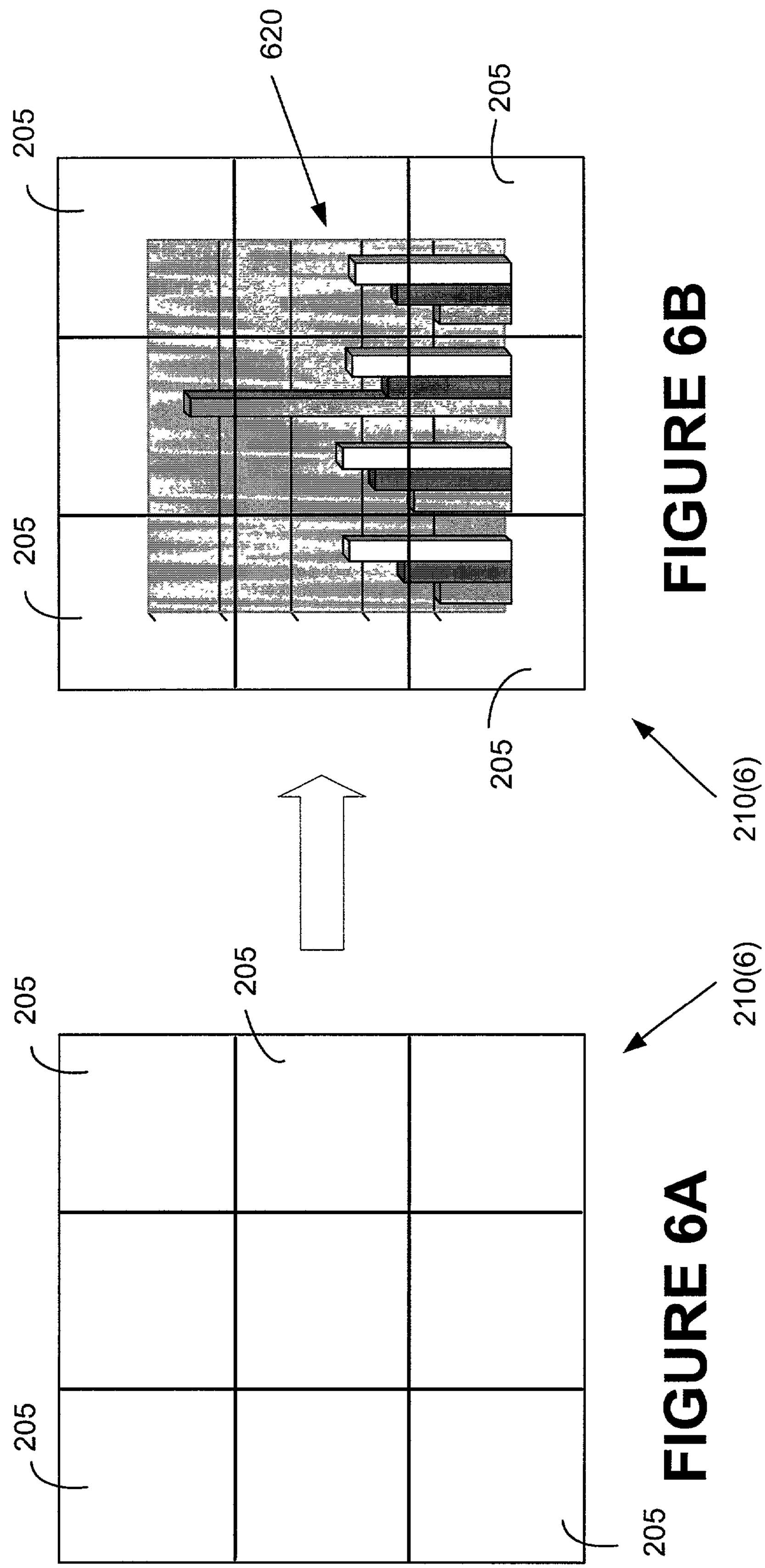
FIGS. 6A–B illustrate a stylized block diagram of a LCD-based key that may be employed in the keyboard of FIG. 2, in accordance with one embodiment of the present invention.

Referring now to FIGS. 6A–B, a block diagram of the numeric keypad section 210(6) (see FIG. 2) of the keyboard 107 is illustrated, in accordance with one embodiment of the present invention. In the illustrated embodiment of FIG. 6A, one or more keys 205 of the section 210(6) may be a liquid crystal display (LCD) panel or screen on which the processor 220 (see FIG. 2) may display the desired information, such as text, graphics, and/or video. In one embodiment, the keys 205 of the section 210(6) may be made using thin-film transistor (TFT) technology, which is an LCD that has a transistor for each pixel. A transistor for each pixel commonly translates to a lower level of current required for pixel illumination. TFT is also known as active matrix display technology, although passive display technology may also be employed to form the keys 205 of the section 210(6), in one embodiment.

FIG. 6B illustrates a graph 620 that is shown on the keys 205 of the numeric keyboard section 210(6) of the keyboard 107, in accordance with one embodiment present invention. In the illustrated embodiment, a plurality of keys 205 of the section 210(6) collectively forms a display panel on which text, graphics, and/or video may be shown. In an alternative embodiment, the graph 620 may be displayed entirely on one key 205 (as opposed to a group of keys 205). In one embodiment, the graphics/video data that is displayed on one or more of the keys 205 may be received through the input interface 242 (see FIG. 2). In one embodiment, the keys 205 of the numeric keypad section 210(6) may be utilized as a display for video teleconferencing, where the streaming video may be displayed on at least a portion of the numeric keypad section 210(6). The user, in one embodiment, may utilize the other sections 210(1–5) of the keyboard 107 as a conventional keyboard to enter text or other input signals while the video signal is shown on the key 205 of the section 210(6). In another embodiment, graphics, such as graphs from spreadsheets or accounting programs may also be displayable on the keys 205 of the numeric keypad section 210(6).

Although in the illustrated embodiment of FIGS. 6A–B the numeric keypad section 210(6) is utilized to display video or graphics, in an alternative embodiment, one or more of the other sections 210(1–5) of the keyboard 107 may also be employed. Furthermore, in one embodiment, all of the keys 205 of the keyboard 107 may collectively form an LCD panel/screen on which information may be displayed. The processor 220 may readily update the LCD-based keys 205 to display new or different information. For example, a key 205 displaying the letter "L" in the English configuration mode may be changed to its equivalent letter (or some other desirable letter) in Arabic by the processor 220 when the keyboard 107 is adapted to operate in the Arabic configuration mode 305(4) (See FIG. 3A).

Figure 7:
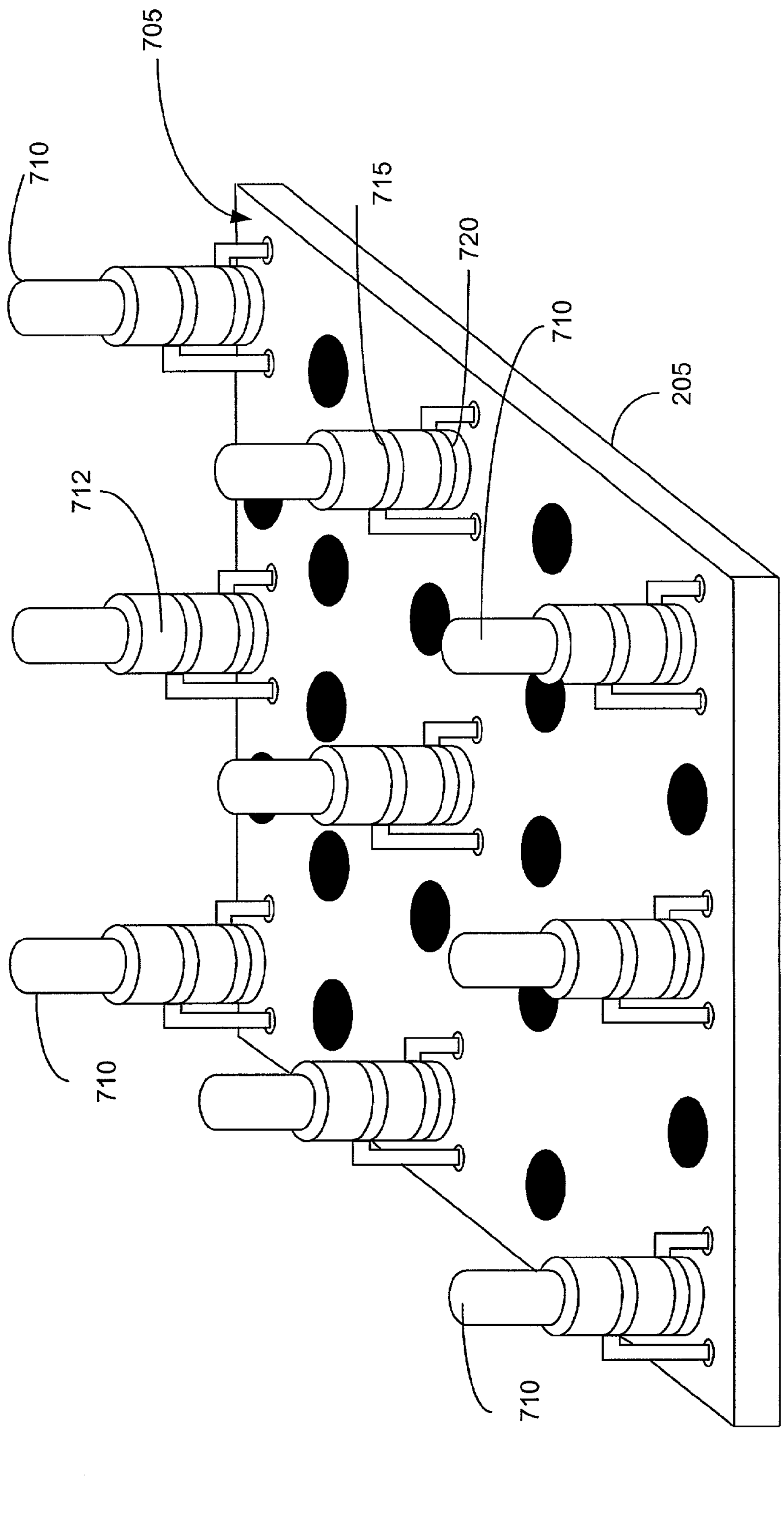
FIG. 7 illustrates a stylized block diagram of a Braille-key that may be employed in the keyboard of FIG. 2, in accordance with one embodiment of the present invention.

Referring now to FIG. 7, an isometric view of an alternative embodiment of the key 205 of the keyboard 107 is shown. In the illustrated example of FIG. 7, the key 205 of the keyboard 107 includes a matrix 705 of pins 710 that may extend through a keycap (810 in FIGS. 8A and 8B). The pins 710, in one embodiment, may be approximately 1 to 1.5 millimeters wide, and may have wide, rounded tops, although in other embodiments any desirable variety of sizes and/or shapes of the pins 710 may be employed. Although not so limited, the matrix in FIG. 7 is a 5×5 pin-matrix 705. In one embodiment, the pins 710 of the key 205 may be raised above the key cap 810 (shown in FIGS. 8A and 8B) of the key 205, where the tops of the raised pins 710 form one or more Braille letters. In the illustrated embodiment, each pin 710 is enclosed in cylindrical-shaped sleeves 712 that are wrapped by an upper coil 715 and a lower coil 720.

The coils 715, 720 together operate to move the pins 710 up and down, as explained below. Each sleeve 712, in one embodiment, includes a magnetically movable object (812 in FIGS. 8A and 8B) below the pin 710. Although not so limited, in the illustrated embodiment the magnetically movable object is a ferrite bead 812. The ferrite bead 812 is attracted in the direction of the coils 715, 720, when the coils 715, 720 are charged. That is, when the upper coil 715 in the sleeve 712 is energized, the ferrite bead 812 is attracted in an upward direction towards the upper coil 715. As the bead 812 moves up, it lifts the pin 710 along with it. To lower the pin 710, the lower coil 720 is charged, which attracts the ferrite bead 812 towards the lower coil 720, thereby causing the pin 710 to move downward as well.

In one embodiment, the processor 220 raises selected pins 710 of the keys 205, depending on the Braille letter to be displayed. In an alternative embodiment, the pins 710 of the keys 205 may be controlled by a processor card (not shown) positioned under each key 205 of the keyboard 107. In one embodiment, the processor card may have cylindrical shaped cavities that act as a sleeve from which the pins 710 may slide in and slide out.

Figure 8A:
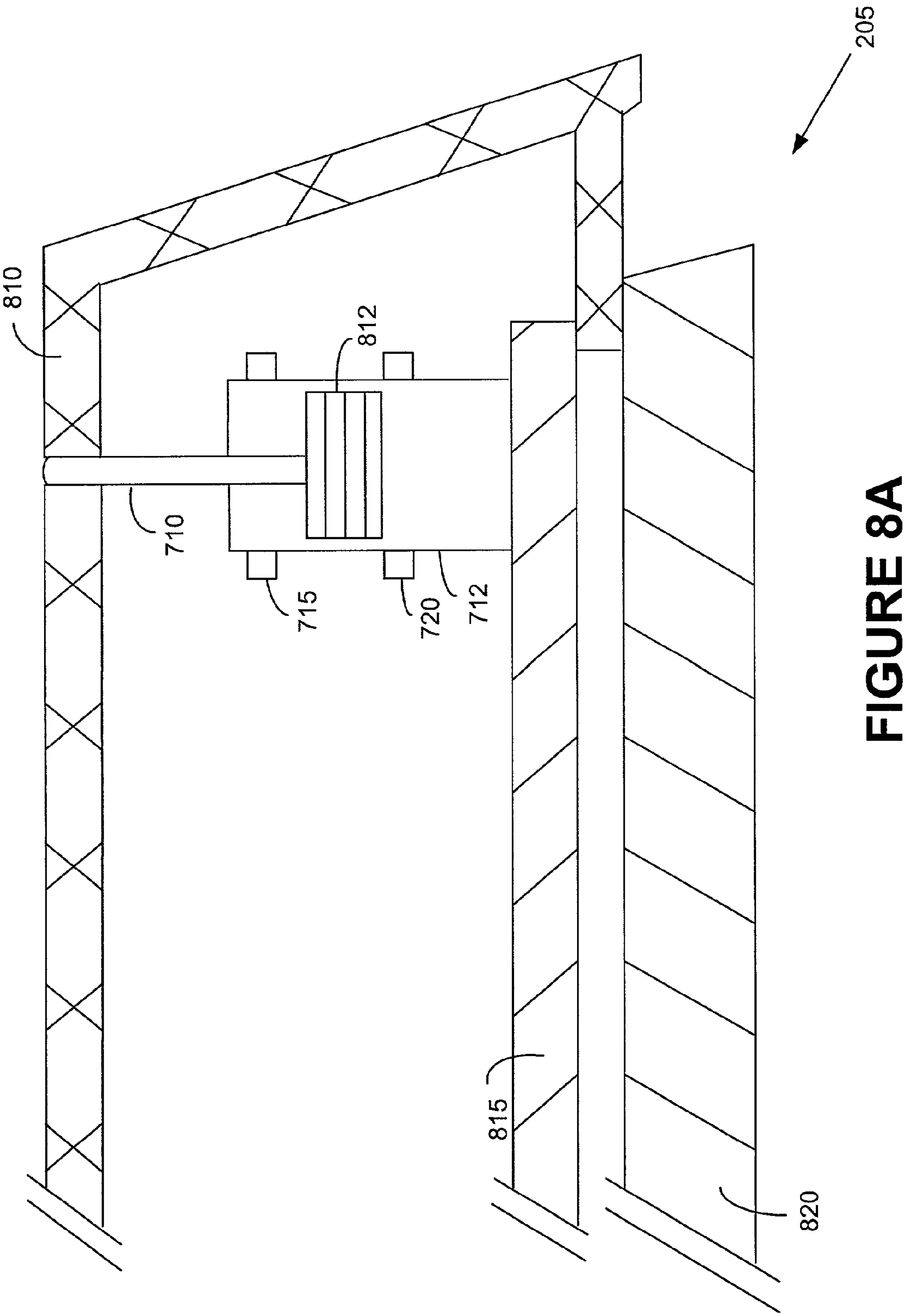
FIG. 8A illustrates a stylized cross-sectional view of the key of FIG. 7 in a non-Braille configuration, in accordance with one embodiment of the present invention.
Figure 8B:
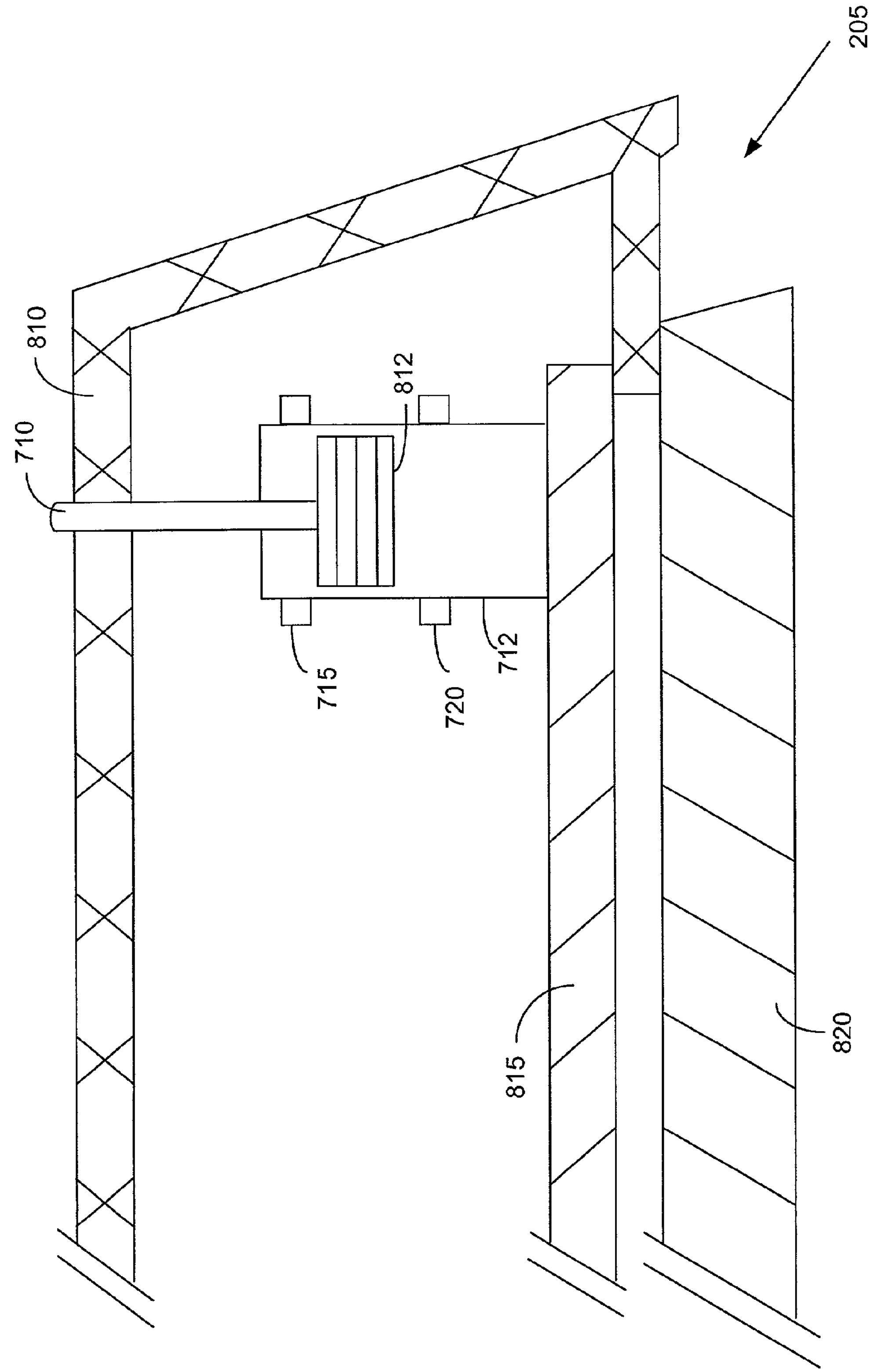
FIG. 8B illustrates a stylized cross-sectional view of the key of FIG. 7 in a Braille configuration, in accordance with one embodiment of the present invention.

Referring now to FIGS. 8A–8B, a stylized cross-sectional view of the key 205 of FIG. 7 is shown, in accordance with one embodiment of the present invention. For ease of illustration, only one pin 710 of the matrix 705 is shown. Furthermore, the control circuitry for the matrix 705 of pins 710 is not shown, as such circuitry is within the scope of those skilled in the art having the benefit of this disclosure. Additionally, for clarity, the illustrations of FIGS. 8A–B have been magnified, and, as such, the illustrations may not necessarily be drawn to scale.

FIG. 8A shows the key 205 of the keyboard 107 in a non-Braille configuration mode 320(1) (i.e., conventional keyboard mode), as the pin 710 is in a down position and thus substantially aligned with the top surface of a key cap 810 of the key 205. During the non-Braille mode 320(1), the lower-coil 720 is energized, thereby attracting the ferrite bead 812 in a downward direction inside the sleeve 712. The sleeve 712 rests on a support layer 815, through which power to the coils 715, 720 may be supplied, if desired. The key cap 810 lies above a conventional key mechanism layer 820, which, when depressed vis-à-vis the key cap 810, may make an electrical connection with the underlying key matrix (not shown).

FIG. 8B shows the keyboard 107 operating in the Braille configuration mode 320(2). In this mode, one or more of the pins 710 may be raised above the key cap 810 of the key 205 to create a Braille surface. In the Braille configuration mode 320(2), the processor 220 causes the upper coil 715 to be energized, which then attracts the ferrite bead 812 in an upward direction, towards the upper coil 715. As the ferrite bead 812 moves up, it pushes the pin 710 upward as well. In the Braille configuration mode 320(2), the key 205, when selected, depresses the key mechanism layer 820, which then completes the circuit connection with the underlying key matrix (not shown). The processor 220, based on the current flow through the key matrix, determines the key 205 that was selected by the user. Once the key 205 that was depressed by the user is identified, the processor 220 uses the character map 222 to determine the character that is mapped to the key 205 that was selected by the user.

Although the illustrated embodiment includes two coils 715, 720 for controlling the movement of the pin 710, in an alternate embodiment, a single upper coil 715 may be employed. That is, the size of the ferrite bead 812 or the sleeve 712 may be chosen such that the top surface of the pin 710, in the non-Braille configuration 320(1), may "rest" substantially flush with the top surface of the key cap 810. In the Braille configuration 320(2), the pin 710 may be raised by energizing the upper coil 715. When switching back to the non-Braille configuration 320(1), the pin 710 may remove power to the upper coil 715, which then causes the pin 710 to fall to its resting position where the top surface of the pin 710 is substantially aligned with the top surface of the key cap 810. The ferrite bead 812 falls to its resting position because the unenergized upper coil 715 is unable to provide sufficient electromagnetic force to hold or attract the ferrite bead 812. In yet another embodiment, a single upper coil 715 may be employed to raise the pin 710, and a spring-like mechanism may be utilized to restore the pin 710 to its initial position.

Figure 9:
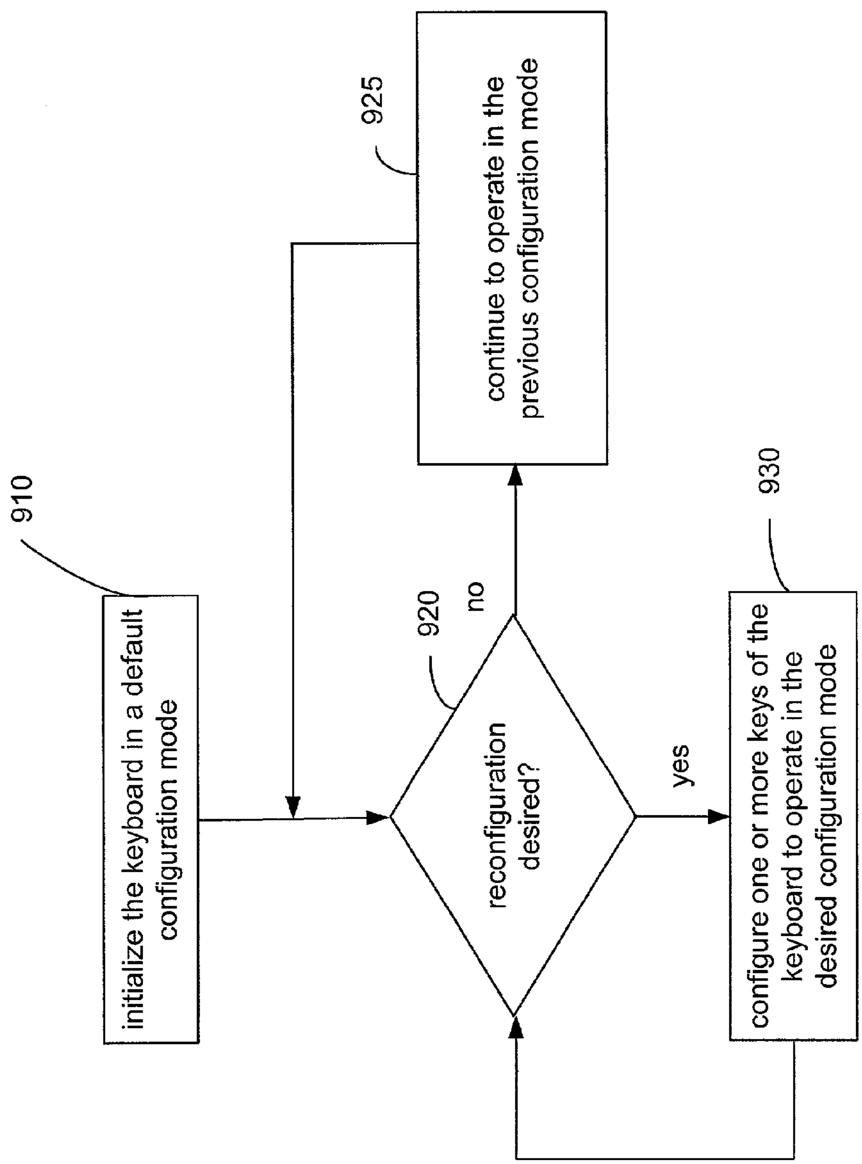
FIG. 9 depicts a flow diagram of a method that may be employed by the keyboard of FIG. 2, in accordance with one embodiment of the present invention.

Referring now to FIG. 9, a flow diagram of a method for configuring the keyboard 107 is illustrated, in accordance with one embodiment of the present invention. The keyboard 107 initializes (at 910) in a default configuration mode. The default configuration mode may be any one of the plurality of configurations that is supposed by the keyboard 107. For example, in one embodiment, the keyboard 107 may initialize (at 910) with conventional Spanish keyboard settings.

The processor 220 of the keyboard 107 determines (at 920) reconfiguration of one or more keys 205 of the keyboard 107 is desired. The processor 220 may determine (at 920) that reconfiguration of the keyboard 107 is desired in one of a variety of ways, including but not limited to, detecting a selection of a configuration setting from the configuration panel 245 (see FIG. 2) of the keyboard 107 and/or receiving an indication from an external source, such as the processor-based system 105 (see FIG. 1). For example, in one embodiment, the keyboard 107 may receive the request to change the configuration of the keyboard 107 from the processor-based system 105 via the input interface 242 (see FIG. 2).

If the processor 220 determines (at 920) that reconfiguration is not desired, then the keyboard 107 continues (at 925) to operate in the previously configured mode. Thus, as an example, if reconfiguration (at 920) is not desired after initialization (block 910), the keyboard 107 continues (at 925) to operate in the default mode (i.e., previously configured mode, in this case).

If the processor 220 determines (at 920) that the user desires to change the configuration of the keyboard 107, then the processor 220 configures (at 930) one or more of the keys 205 of the keyboard 107 in the desired configuration mode. A more detailed description of the act of block 930 is illustrated in FIG. 10.

Figure 10:
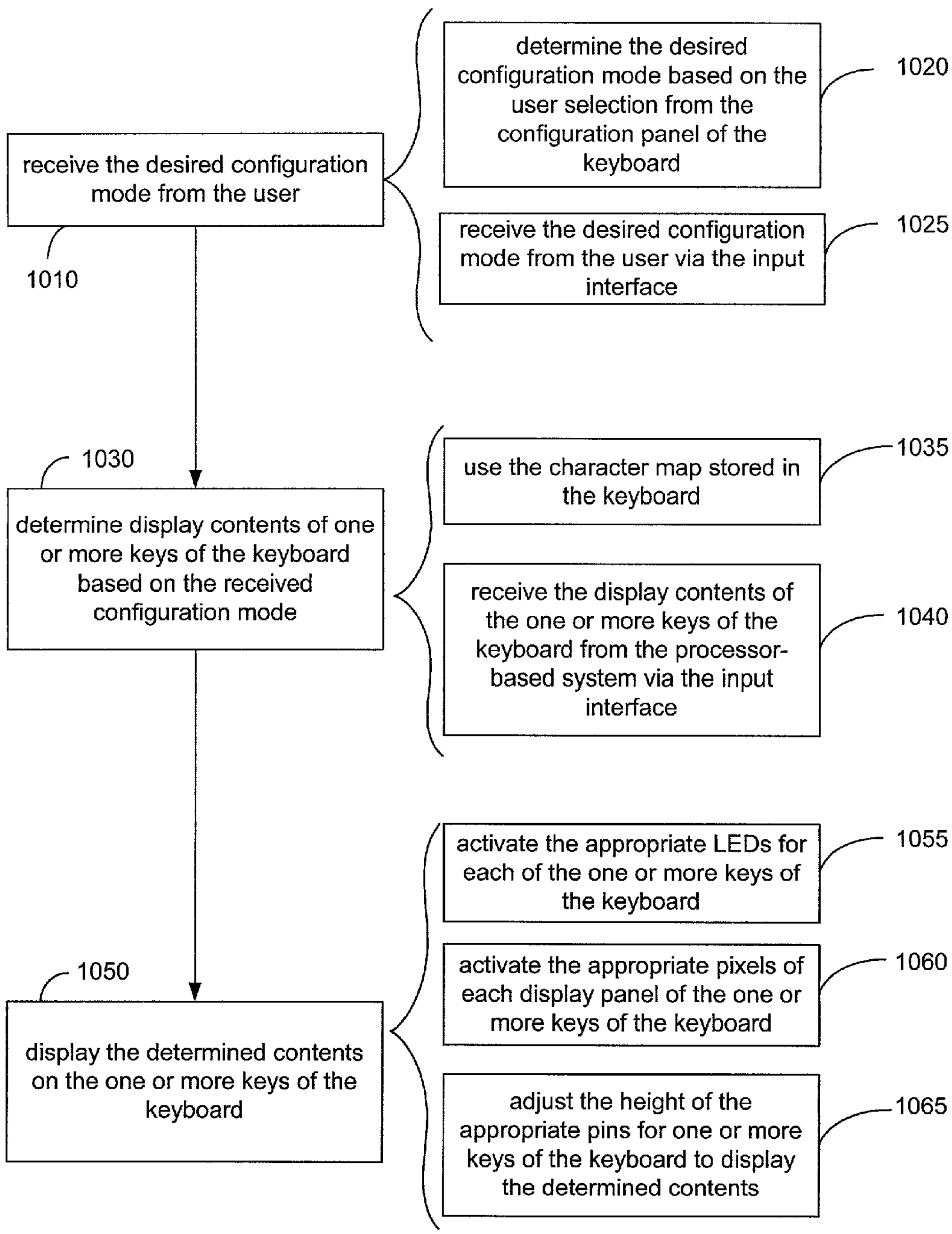
FIG. 10 illustrates a flow diagram of an alternative method that may be employed by the keyboard of FIG. 2, in accordance with one embodiment of the present invention.

In the flow diagram of the method of FIG. 10, the processor 220 receives (at 1010) the configuration mode that the user desires. In one embodiment, the processor 220 may determine (at 1020) the desired configuration mode based on the option selected by the user using the configuration panel of the keyboard 107 (see FIGS. 3A–C). Alternatively, the processor 220 may receive (at 1025) the desired configuration mode from the user via the input interface 242. For example, in one embodiment, the user may utilize the application 184 (see FIG. 1) to provide the desired configuration mode to the keyboard 107 from the processor-based system 105 via the input interface 242.

Based on the configuration mode received (at 1010), the processor 220 determines (at 1030) the contents that should be displayed on the one more keys 205 of the keyboard 107. In one embodiment, the processor 220 may determine (at 1030) the contents to be displayed by using (at 1035) the information stored in the character map 222 of the keyboard 107. For example, if the user wishes to change the configuration of the keyboard 107 to the Spanish configuration 305(2) (See FIG. 3A), the processor 220 may use the character map 222 to determine the contents that should be displayed on the keys 205 of the keyboard 107 for the Spanish configuration 305(2). In one embodiment, at least one character map 222 may be stored in the memory 225 of the keyboard 107 for each configuration mode that is supported by the keyboard 107. In an alternative embodiment, the processor 220 may determine (at 1030) the contents to display on the keys 205 of the keyboard 107 by receiving (at 1040) the display contents from the processor-based system 105 via the input interface 242. That is, in this alternative embodiment, the processor-based system 105 may provide the information that is to be displayed on the keys 205 of the keyboard 107.

In one embodiment, the contents determined (at 1030) by the processor 220 for display on the one more keys 205 of the keyboard 107 may include one or more symbols, which may comprise ASCII characters, at least a portion of graphic images or video images, or any other information that is displayable on the keys 205 of the keyboard 107.

The processor 220 displays (at 1050) the contents determined (at 1030) on the one or more keys 205 of the keyboard 107. The act of displaying (at 1050) the contents determined (at 1030) on the keys 205 may depend on the display type utilized for the keys 205, as explained below. For example, if the keys 205 employ an LED-type display (see FIGS. 4A–B), then the processor 220 may display the contents by activating (at 1055) the appropriate LEDs 420 (see FIGS. 4A–B) for each of the one or more keys 205 of the keyboard 107.

Figure 11B:
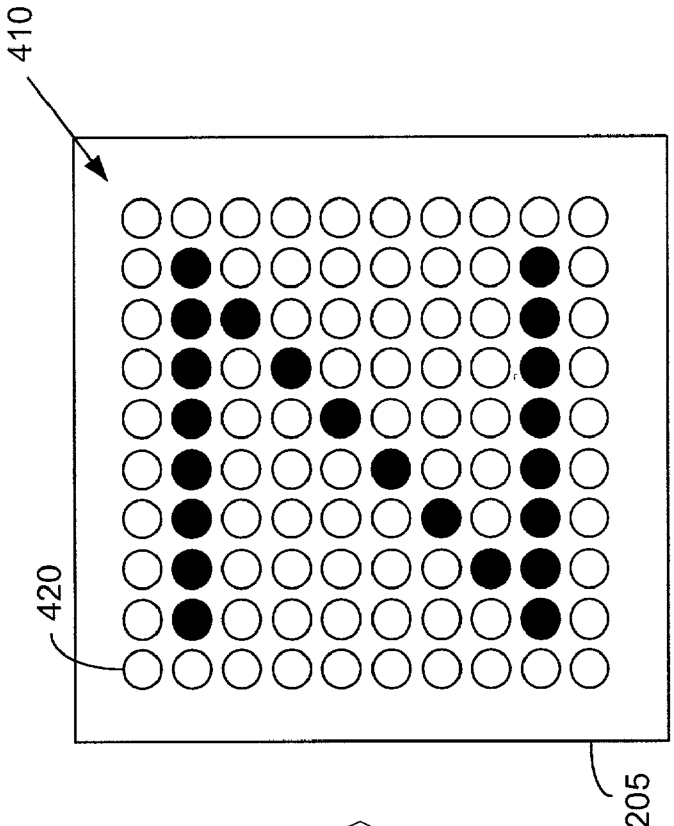
FIGS. 11A–B illustrate a stylized block diagram of changing the contents displayed on the LED-based key of FIG. 6A, in accordance with one embodiment of the present invention.
Figure 11A:
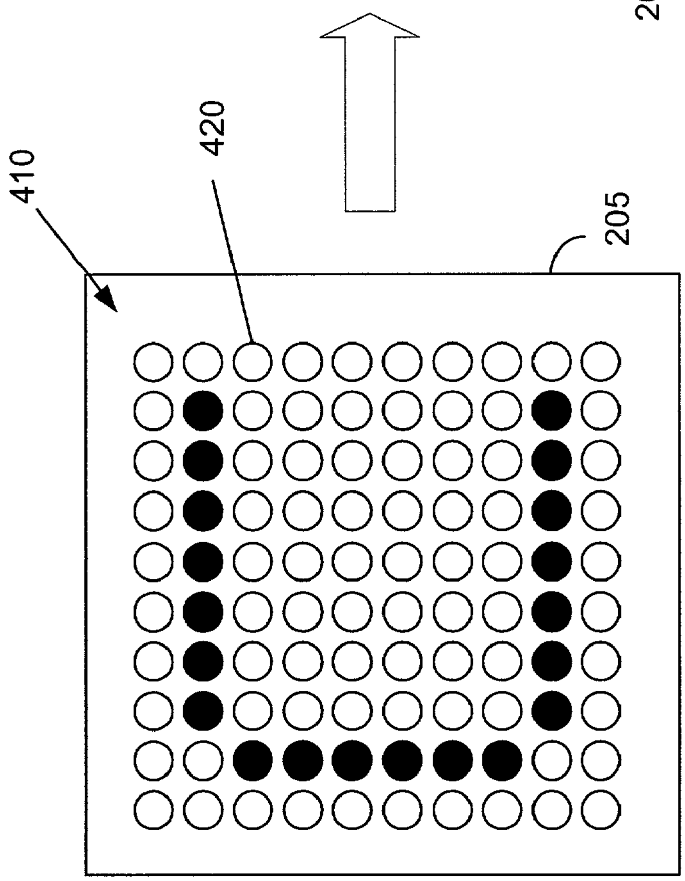

The act of activating (at 1055) the appropriate LEDs 420 in each key 205 is illustrated in FIGS. 11A–B. FIG. 11A shows a block diagram of the key 205 that displays the letter "C" before the key 205 is reconfigured. That is, the processor 220 displays the letter "C" by activating the appropriate LEDs 420 of the LED matrix 410. Assuming now that the user desires to switch the configuration of the keyboard 107 such that the key 205 displays the letter "Z," as opposed to the letter "C," the processor 220, in one embodiment, deactivates all of the LEDs 420 and then activates the appropriate LEDs 420 of the matrix 410 so that the letter "Z" is displayed, as shown in FIG. 11B. Similarly, the letter "C" displayed on the key 205 of FIG. 11A may be changed to other characters as well, such as a character of another language. Once the appropriate LEDs 420 are activated (at 1055) to display the desired information (i.e., symbol(s)) on the one or more keys 205 for a given configuration mode, the user may proceed to input the displayed information into the processor-based system 105 using the one or more keys 205 from the keyboard 107. In this manner, the keys 205 of the keyboard 107 may be utilized to input into the processor-based system 105 any desirable information displayed on the keys 205.

Referring again to FIG. 10, as mentioned, the act of displaying (at 1050) the contents determined (at 1030) may depend on the display type of the keys 205. Thus, if the display type of the keys 205 is an LCD-display, then the processor 220 may display (at 1050) the contents by activating (at 1060) the appropriate pixels of each display panel of the one or more keys 205 of the keyboard 107. FIG. 6B, discussed earlier, illustrates one example where the processor 220 activates selected pixels of the keys 205 of the numeric keypad section 210(6) to display the graph 620.

Once the appropriate pixels are activated (at 1060) on the display of the keys 205 to display the desired information (i.e., symbol(s)) for a given configuration mode, the user may proceed to input the displayed information into the processor-based system 105 using the one or more keys 205 from the keyboard 107. In this manner, the keys 205 of the keyboard 107 may be utilized to input into the processor-based system 105 any desirable information that is displayed on the keys 205.

If the keyboard 107 supports Braille lettering, then the processor 220 may display (at 1050) the contents on the keys 205 by adjusting (at 1065) the height of the appropriate pins (710—see FIG. 7) for those keys 205. FIGS. 7 and 8A–B, discussed above, provide an illustrative example of how the processor 220 is able to adjust the height of the pins 710 to form the desired Braille letters on the one or more keys 205 of the keyboard 107.

Once the appropriate pins 710 of the keys 205 are adjusted (at 1065) to the desired height to display the desired information (i.e., Braille letters) for the Braille configuration mode 320(2) (See FIGS. 3B–C), the user may then input the information displayed on the keys 205 into the processor-based system 105 by selecting that key 205 from the keyboard 107. In this manner, the keys 205 of the keyboard 107 may be utilized to input the displayed Braille letters into the processor-based system 105.

Figure 12A:
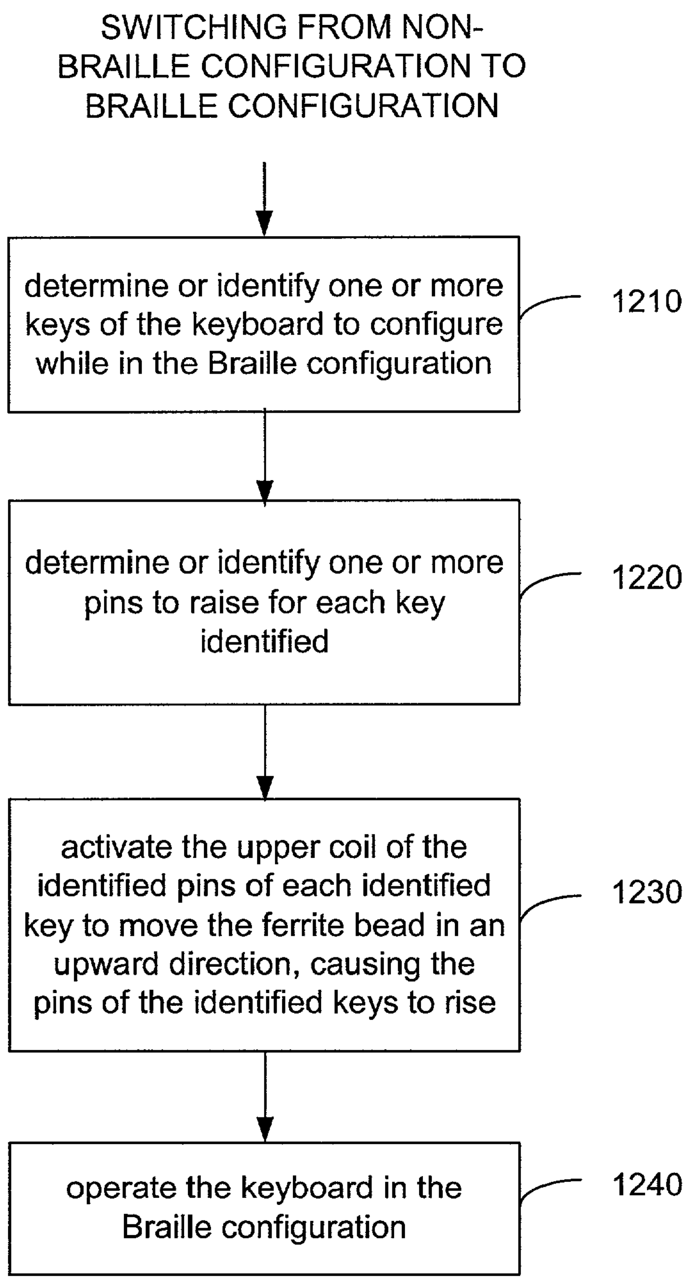
FIGS. 12A–B depict a flow diagram of a method for switching to and from a Braille configuration mode, in accordance with one embodiment of the present invention.
Figure 12B:
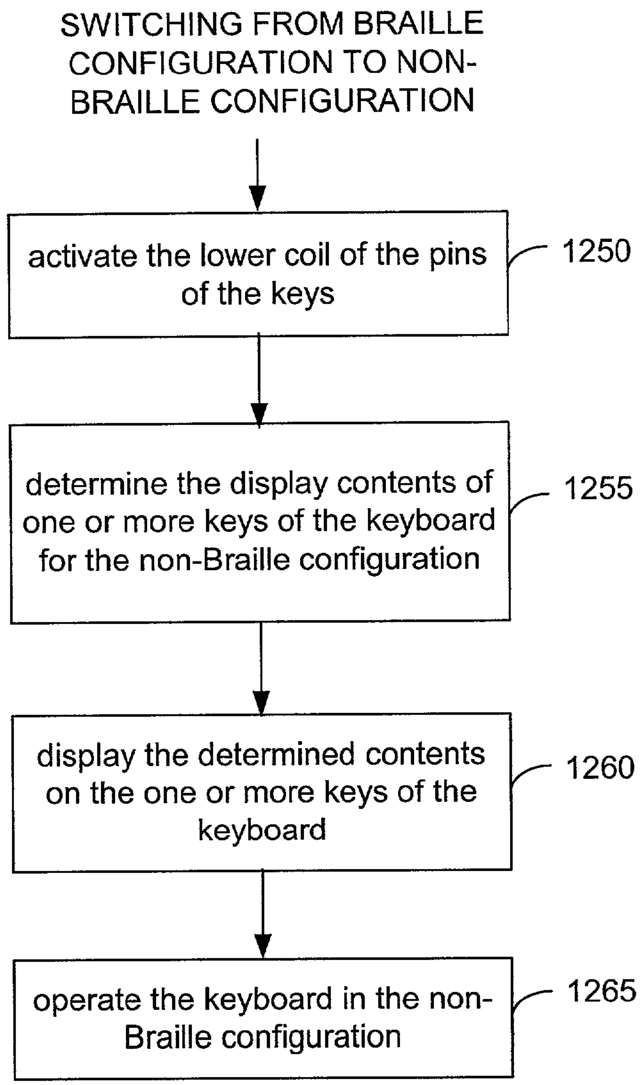

Referring now to FIGS. 12A–B, a flow diagram of a method for switching to and from the Braille configuration mode 320(2) is illustrated, in accordance with one embodiment of the present invention. In particular, FIG. 12A illustrates the method of switching from the non-Braille configuration mode 320(1) to the Braille configuration mode 320(2). When switching to the Braille configuration mode 320(2), the processor 220 determines or identifies (at 1210) one or more keys 205 of the keyboard 107 to configure with Braille letters. The character map 222 (see FIG. 2) stored in the memory 225 of the keyboard 107, for example, may contain the key configuration information. The processor 220, in one embodiment, may utilize the stored character map 222 to identify (at 1210) the one or more keys 205 that require configuring. The processor 220 then determines (at 1220) one or more pins 710 to raise for each key 205 that is identified (at 1210). In one embodiment, the processor 220 may utilize the character map 222 to identify the pins 710 to raise to form the desired Braille letters.

The processor 220 activates at 1230 the upper coil 715 (see FIG. 7) of the pins 710 that are identified (at 1220) for each key 205 that is identified (at 121). Activating (or energizing) (at 1230) the upper coil 715 moves the ferrite bead 812 (see FIG. 8B) in an upward direction, causing the respective pins 710 of the identified keys 205 to rise. The pins 710, when raised, form one or more Braille letters on the keys 205 of the keyboard 107. The keyboard 107 thereafter operates (at 1240) in the Braille configuration mode.

FIG. 12B illustrates the method of switching from the Braille configuration mode to the non-Braille configuration mode 320(1). When switching to the non-Braille configuration mode 320(1), the processor 220 activates (at 1250) the lower coil 720 (see FIG. 7) of the pins 710 of the keys 205 of the keyboard 107. The processor 220 determines (at 1255) the display contents of one or more keys 205 of the keyboard 107 for the non-Braille configuration mode 320(1). The processor 220 displays (at 1260) the contents determined (at 1255) on the one or more keys 205 of the keyboard 107. The keyboard 107 thereafter operates (at 1265) in the non-Braille configuration mode 320(1) (e.g., conventional mode, for example).

The various system layers, routines, or modules may be executable by the processor 108, 220 (see FIG. 1 and FIG. 2, respectively). As utilized herein, the term "processor," may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory 225 including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A keyboard, comprising:

a plurality of keys, wherein each of the plurality of keys is operable to be depressed, and wherein each key comprises a matrix of pins capable of rising above the surface of the key and displaying a Braille character; and a control unit adapted to:

cause a first set of symbols to be displayed on the plurality of keys in a first mode and a second set of symbols to be displayed on the plurality of keys in a second mode, wherein the first set of symbols and the second set of symbols are each indicative of symbols corresponding to input characters of each of the plurality of keys, and wherein the first mode is a Braille configuration mode and wherein the second mode is a non-Braille configuration mode;

detect a selection of a particular key of the plurality of keys; and provide information indicative of an input character corresponding to the particular key to a processor-based system in response to detecting the selection of the particular key.

2. The keyboard of claim 1, wherein each key comprises a sleeve for each of the pins of the matrix and wherein each of the sleeves comprises an upper coil for causing the associated pin to rise above the surface of the key.

3. The keyboard of claim 1, wherein each sleeve comprises a magnetically movable object positioned below an associated pin, wherein the movable object is adapted to rise in response to the upper coil being energized.

4. The keyboard of claim 1, wherein the movable object is adapted to fall in response to the upper coil not being energized, and wherein the associated pin becomes flush with the surface of the key in response to the fall of the movable object.

5. The keyboard of claim 1, further comprising a configuration selection device coupled to the control unit and configured to allow a user to select either the first mode or the second mode.

* * * * *